M. COMPARE.
RADIOTELEGRAPH SYSTEM.
APPLICATION FILED JULY 6, 1920.

1,356,488.

Patented Oct. 19, 1920.

M. COMPARE.
RADIOTELEGRAPH SYSTEM.
APPLICATION FILED JULY 6, 1920.

1,356,488.

Patented Oct. 19, 1920.
7 SHEETS—SHEET 3.

Inventor
M. Compare
by Wilkinson & Giusta
Attorneys

M. COMPARE.
RADIOTELEGRAPH SYSTEM.
APPLICATION FILED JULY 6, 1920.

1,356,488.

Patented Oct. 19, 1920.

Inventor
M. Compare
by Wilkinson + Giusta
Attorneys

M. COMPARE.
RADIOTELEGRAPH SYSTEM.
APPLICATION FILED JULY 6, 1920.

1,356,488.

Patented Oct. 19, 1920.
7 SHEETS—SHEET 5.

Inventor
M. Compare
by Wilkinson & Giusta
Attorneys.

M. COMPARE.
RADIOTELEGRAPH SYSTEM.
APPLICATION FILED JULY 6, 1920.

1,356,488.

Patented Oct. 19, 1920.

Inventor
M. Compare
by Wilkinson & Giusta
Attorneys.

M. COMPARE.
RADIOTELEGRAPH SYSTEM.
APPLICATION FILED JULY 6, 1920.

1,356,488.

Patented Oct. 19, 1920.
7 SHEETS—SHEET 7.

Inventor
M. Compare
by Wilkinson & Giusta.
Attorneys.

UNITED STATES PATENT OFFICE.

MANRICO COMPARE, OF LEGHORN, ITALY.

RADIOTELEGRAPH SYSTEM.

1,356,488.　　　　Specification of Letters Patent.　　Patented Oct. 19, 1920.

Application filed July 6, 1920. Serial No. 294,260.

*To all whom it may concern:*

Be it known that I, MANRICO COMPARE, residing at 4 Via della Banca, Leghorn, Italy, a subject of the King of Italy, have invented certain new and useful Improvements in Radiotelegraph Systems, of which the following is a specification.

This invention refers to wireless telegraphy or other wireless control systems which may be used for initiating or controlling any operation or series of operations which it is desired to initiate or control from a distance by radiant energy such for instance as Hertzian waves or other like or similar means.

I will proceed to first describe my present invention in conjunction with wireless telegraphy.

Especial objects (*inter alia*) of the present invention in connection with wireless telegraphy are (1) to enable messages or signals or the like transmitted by radiant energy to be sent and received with absolute secrecy and (2) to enable such wireless messages or signals or the like to be automatically printed or recorded at the receiving station.

Heretofore in communicating or transmitting messages or signals by radiant energy such messages or signals have usually been received at the receiving station by audible signal or sound on the ear of the attendant at such receiving station and this known method of receiving such messages or signals has many drawbacks and the present invention is designed (*inter alia*) to avoid these drawbacks and to provide (*inter alia*) a method and means of automatically recording such messages or signals at the receiving station, viz. by electro-mechanically recording such messages or letters, signs, symbols or signals, *e. g.* by automatically printing or marking same on paper or other suitable material as same are received.

In Fessenden's British Patent No. 26552 of 1902 a method has been proposed of selective multiple and multiplex signaling by electro-magnetic waves in which groups of electromagnetic waves of one kind are simultaneously generated at the sending station, the number of groups of electromagnetic waves per second being controlled by one or more controllers, each controller consisting of two or more mechanisms each adapted to cause groups of waves to be emitted at a predetermined rate per second, one emission rate being proper to each mechanism while at the receiving station it has been proposed in said prior specification to employ therewith conductors tuned to the periodicity of the electromagnetic waves generated at the sending station and one or more receivers each consisting of two or more mechanisms in operative relation to the conductor and arranged to produce a signal by conjoint action, and each mechanism adapted to respond to one only of the emission rates of the sending end.

The present invention relating to wireless telegraphy consists of or comprises:—

1. For despatching the messages or signals by wireless telegraphy:—

(*a*) A method and means for selecting in rapid succession any two or more series of devices for imparting any two or more trains of impulses of radiant energy each of a different group frequency (*i. e.* each train has a different number of impulses per second) for example this may be effected by a set of keys, for instance a set of keys similar to the keys employed on a typewriter machine, each such key adapted and arranged when actuated to put in successive operation any selected combination of two (or more) of a series of rotary devices each of which rotary devices of said combination of two (or more) will in turn initiate or cause a train of impulses of radiant energy of different group frequency to the other train or trains, *i. e.* the number of impulses per second different to that initiated by the other rotary device (or devices) of said combination.

It must be noted that throughout this specification (unless expressly declared otherwise) by the term "group frequency" it is intended to refer to the number per second of the impulses of a train of impulses of electric or radiant energy.

(*b*) A method and means in conjunction with the said selecting means of initiating or causing two or more trains of impulses (of different group frequency) of radiant energy in rapid succession for each combination representing each letter or signal; for example this may be effected by a series of rotary devices hereinafter referred to as the "rotary impulsators" each arranged and adapted when put into operation (by means such as the aforesaid keys) to initiate or cause for a limited time or period impulses of radiant energy of a group frequency different from each respective group frequency imparted by each of the other said series of rotary impulsators.

(c) A method and means of quickly and easily changing the aforesaid combinations of different group frequencies selected for each letter or signal, to further insure secrecy; and this may be effected for example by a specially designed commutator interposed between said set of keys and said series of rotary impulsators each of different group frequency; said commutator being adapted to be shifted and so designed, constructed and arranged to act that when it is shifted it will change the connections between each and all of the said set of keys and the said series of rotary impulsators and thereupon any individual key on being operated will cause the successive operation of a different combination of rotary impulsators to its previous combination and thus impart successive trains of impulses, of frequencies different to those it last previously imparted.

2. For receiving such impulses, messages or signals by wireless telegraphy:—

(d) A method and means of receiving in succession each of the two (or more) trains of impulses of radiant energy of each of the aforesaid combinations emitted or transmitted from the aforesaid despatching station; and this may be effected by the employment of a system of oscillators of the character and arranged to act in the manner somewhat similar to that described either in the specification of Compare's British Patent No. 22807 of 1914 or application for British patent dated 29th October, 1918, No. 134297 or both so that on any selected two (or more) of said oscillators having completed their respective functions thereupon two (or more) battery circuits are closed and any desired act or operation or thing performed or caused or permitted as for example any visible or suitable sign or signal or both may be given or the operation of each pair (or other combination) of oscillators may be arranged to cause or permit the intended letter, character or signal to be automatically printed or otherwise automatically recorded in accordance with this invention as aforesaid.

(e) A method and means of automatically printing or otherwise automatically recording each letter, sign, symbol or signal received; and this may be effected through the medium of a rotatory contact roller or drum provided with a number of contact points each of which is in or forms part of a different battery circuit and a number of selector devices each of which has a plurality of contact fingers thereon and a rotatory printing or marking roller or drum having around its periphery the desired series of letters, characters, figures, signs, symbols or other signal which it is intended to print or mark on a tape or other piece of paper or other suitable material; the arrangement being such that for example in any combination of two oscillators when the first oscillator (of any such pair of oscilllators) has functioned it will (by closing a local circuit or relay) simultaneously cause a movement of its appropriate selector device so as to put the contact fingers of this particular selector device in contact with the aforesaid contact roller and thereafter immediately when the second oscillator functions it will (through a suitable local circuit or relay) close a circuit through one of said contact fingers and said contact roller or one of the contact points on said contact roller, and the particular circuit thus closed through the contact roller and said fingers will cause the appropriate letter or sign, etc., to be printed or marked by the printing roller on the paper or such material arranged to be thus printed or marked.

(f) A method and means of quickly and easily changing the respective combination of circuits, each circuit of each of which combinations is successively closed by the operation of the oscillators as aforesaid to thereby first move the selector device and then place one of the contact fingers and the contact drum in circuit, and this change may be effected (for example by pre-arrangement with the despatching station) by correspondingly or suitably moving a commutator identical with or by similar means to that or those referred to under above paragraph (c) such commutator or means being interposed in the circuits closed in succession by the successive functioning of the oscillators in said system of oscillators and thus put in circuit with the selector devices and fingers and contact roller such as hereinbefore referred to.

For operating in combination two of the aforesaid rotatory impulsators referred to in the aforesaid parapraph (b) for despatching two successive trains of impulses of radiant energy each of different frequency, each of the sets of keys referred to under the aforesaid paragraph (a) may be arranged to act as follows:—

Each key is located between two contact points (each contact point being in a different circuit) disposed on opposite sides of said key which latter in its normal position of rest lies between said two contact points and out of contact therewith; the contact point on one side in a circuit adapted to operate one said rotary impulsator so that when said circuit (in which this contact point is located) is closed the relative rotary impulsator is operated and a train of impulses of radiant energy thereby caused and when the circuit in which the other said contact point is located is closed thereby a train of impulses of radiant energy of another frequency is caused.

Thus by operating (pressing, rocking, turning, sliding or otherwise moving) the key it will first make and break contact with one said contact point and thereafter make make and break contact with the other said contact point; and thereby cause the two successive trains of impulses of radiant energy.

When a set of eight oscillators or vibrators each of different periodicity is used at the receiving station same, taken in combination of two by two, will give 28 different combinations of regular order, which will be sufficient for the alphabet of the English language; but a greater or less number than 8 oscillators or vibrators may be employed if it is desired to form a different number of combinations: and a corresponding number of rotatory impulsators is or may be provided.

The oscillators are or may be connected in parallel or in series through a relay controlled by the detector such as aforesaid; and each oscillator is made to operate (e. g., as described in either of the beforementioned specifications) by means of a suitable train of impulses sent from the despatching station—said train of impulses being of a frequency corresponding to the frequency of the said oscillator.

The automatic printing device is arranged to print each character or letter, etc., by the successive operation of each combination of two or more oscillators as aforesaid; and in the case of combinations of two oscillators the printing operations may be carried out as follows:—

On one spindle are placed six sets of fingers each set respectively being insulated from and adapted to move independently of the others; the six sets being made of 7, 6, 5, 4, 3 and 2 fingers respectively.

Each set is controlled by an electro-magnet for the purpose of bringing them near a cylinder, such as the aforesaid rotary contact roller, which turns at a constant speed; and on the periphery of this cylinder are placed 28 teeth along its length and each is touched by its respective finger once for each revolution of said cylinder when the electro-magnet moves them nearer the cylinder.

When an oscillator has functioned, it closes the circuit of the respective electromagnet which moves the set of fingers, driving them nearer the cylinder but the operation of printing the character is not completed until a second oscillator has been made to operate which causes an electric current to flow through the finger as it engages its particular tooth on the cylinder and thus operates the electro-magnet which presses one part of a length of traveling paper on a type ring fixed concentrically with the cylinder. The characters on the type ring are in line with their corresponding teeth so that the paper is pressed on the character required at the time the finger touches the tooth. At the same time that the electro-magnet presses the paper it also opens the circuit supplying current to the system, so that the mechanism returns to its original state and is ready for the next operation.

The aforesaid rotary impulsators or any other device employed for producing and transmitting impulses of radiant energy, give regular impulses the frequency of which corresponds to the frequency of the oscillators to be operated thereby at the receiving station.

The impulses may be obtained by a rotary discharger, e. g. a spark-gap one of the electrodes of which is stationary and the other (advantageously in multiple form) arranged on a wheel or other rotary device which may either be arranged to have the number of its revolutions per minute changed or by a number of rotary dischargers all running at the same speed and having a different number of sectors thereon so arranged as to produce different frequencies.

This invention may also be used as a wireless control system, for initiating or controlling any operation or series of operations by radiant energy. A system of wireless control is described in Compare's British Patent No. 22807 of 1914. In applying this invention to such a control system, a group of two (or more) successive trains of impulses (each of predetermined frequency) may be utilized to initiate or control the distant operation, e. g. the group of trains of impulses corresponding to a letter of the alphabet may be so used, or the groups corresponding to two or more letters may be so used: then by means of commutators (e. g. as hereinafter more specifically described) the frequencies of each train may be altered while still retaining the means of initiation or control.

In the accompanying drawings there are illustrated methods and apparatus for carrying the invention relating to wireless telegraphy into practice:—

Figs. 3 and 4 show in more detail one form of the despatching and receiving apparatus respectively.

Fig. 6 is an alternative printing device.

Fig. 7 is a side view of the printing device in Fig. 4.

Throughout these figures the same letters and numerals indicate the same or corresponding parts.

Describing first the despatching apparatus (e. g. as illustrated diagrammatically in Fig. 1) $A^1$ is an aerial with means in conjunction therewith for generating and radiating waves of radiant energy, such as Hertzian waves. $R^1$ $R^2$ $R^3$ $R^4$ $R^5$ $R^6$ $R^7$ and $R^8$ are rotary impulsators each of which is (or may be) electrically connected with each of a similar number of commutators $C^1$ $C^2$ $C^3$ $C^4$ $C^5$ $C^6$ $C^7$ and $C^8$.

Figure 1:
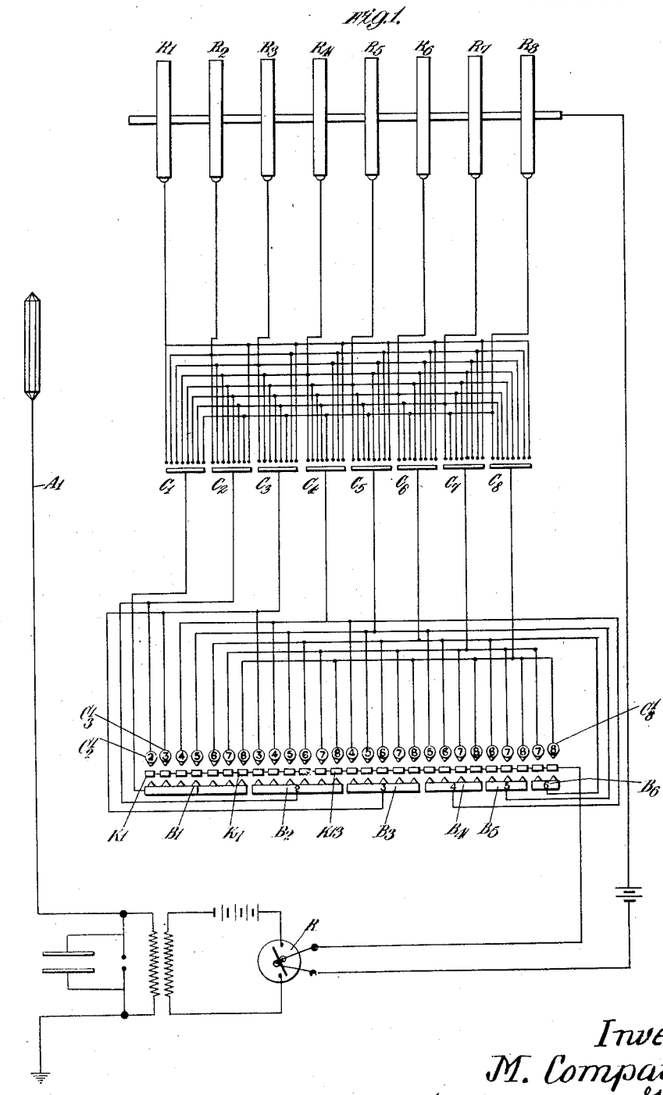
Figures 1 and 2 are diagrammatic representations of the despatching and receiving apparatus respectively.

$B^1$ $B^2$ $B^3$ $B^4$ $B^5$ and $B^6$ are contact bars so arranged that $B^1$ has 7 contacts (i. e. one less than the number of rotatory impulsators and commutators) $B^2$ has 6 contacts (i. e. one less than $B^1$) and so on; so that $B^6$ has only two contacts.

In Fig. 1 only six contact bars are shown.

Contact bar $B^1$ is electrically connected with commutator $C^1$, $B^2$, with $C^2$ and so on.

Opposite the contacts on the contact bars B and adjacent thereto are 28 insulated contacts ($C^1$) each indicated by a numeral 2 to 8 so arranged that 7 insulated contacts (viz, $C^{\frac{1}{2}}$ to $C^{\frac{1}{8}}$) lie opposite the contacts on the contact bar $B^1$; six insulated contacts (viz, $C^{\frac{3}{2}}$ to $C^{\frac{3}{8}}$) lie opposite the contacts on contact bar $B^2$, and so on; each insulated contact is electrically connected to its corresponding commutator: i. e. $C^{\frac{1}{2}}$ is connected to $C^2$, $C^{\frac{1}{3}}$ to $C^3$, and so on. 28 keys $K^1$ to $K^{28}$ respectively lie between these two series of contacts so that each pair of adjacent contacts has its own key; thus key $K^1$ lies between $C^{\frac{1}{2}}$ and the first contact on $B^1$, $K^2$, lies between $C^{\frac{1}{3}}$ and the second contact on $B^1$, and so on.

The rotary impulsators $R^1$ $R^2$, etc., are mounted and rotate on a common shaft which is electrically connected to one end of the winding of a relay R, to the other end of which winding the keys K are connected; the contacts of the relay are connected to the apparatus for producing Hertzian waves.

Normally each commutator C is connected with its corresponding rotary impulsator i. e. $C^1$ with $R^1$, $C^2$ with $R^2$, and so on.

The keys K are so arranged and devised that each key when operated first makes contact with one of its pair of adjacent contacts, then breaks that contact then makes contact with the other of its pair of contacts and then finally breaks that contact and comes again to a neutral position; e. g. the key $K^1$ on being operated first makes contact with the first contact on $B^1$, then breaks that contact and makes contact with $C^{\frac{1}{2}}$, then finally breaks that contact and returns to neutral position. When key $K^1$ makes contact with the first contact on $B^1$ it will be seen by following the connection that a circuit is closed through key $K^1$, bar $B^1$, commutator $C^1$, rotary impulsator $R^1$, relay R, back to $K^1$.

Each rotary impulsator is so devised that it causes a train of electric impulses of predetermined frequency to traverse an electric circuit containing it; and each impulsator has a frequency differing from that of each one of all the other impulsators.

Thus, when the above named connection is made, a train of electric impulses of a frequency corresponding to the rotary impulsator $R^1$ traverses the above mentioned circuit through the relay R and causes a train of impulses of radiant energy of the same frequency to be radiated from the aerial $A^1$. When the key $K^1$ is moved out of contact with the first contact $B^1$ the electric circuit is broken and the train of radiant impulses ceases. The key $K^1$ then makes contact with the second contact $C^{\frac{1}{2}}$ and it will be seen that this closes a circuit through contact $C^{\frac{1}{2}}$, commutator $C^2$, rotary impulsator $R^2$, relay R and key $K^1$ back to contact $C^{\frac{1}{2}}$. The closing of this circuit will in the manner above described cause a train of impulses of radiant energy to be emitted from the aerial $A^1$ of frequency corresponding to the rotary impulsator $R^2$.

In this way two trains of impulses of radiant energy (each of predetermined but different frequency) are caused to be radiated from the despatching aerial $A^1$ in rapid succession.

Referring now to the receiving apparatus (e. g. as diagrammatically illustrated in Fig. 2) $A^2$ is the receiving aerial D is a detector such as described in the specification of my application for British Letters Patent No. 15229 of 1919; and R is a relay.

Figure 2:
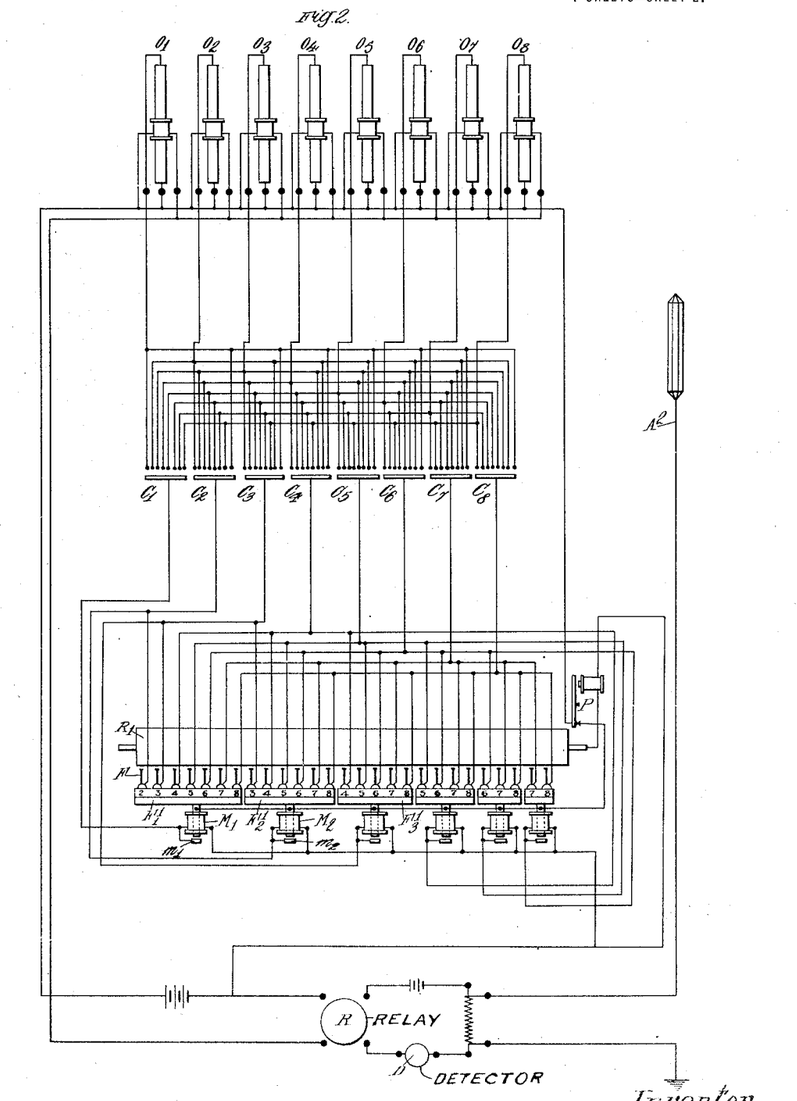

$O^1$ to $O^8$ are eight oscillators such for instance as are described in the specification of British Letters Patent No. 22807 of 1914 or No. 134297. $C^1$ to $C^8$ are commutators similar to those above referred to. $F^{\frac{1}{1}}$ to $F^{\frac{1}{6}}$ are movable sliding bars each having a series of fingers F attached thereto thus the bar $F^1$ has seven fingers, viz. $F^2$ to $F^8$; $F^{\frac{1}{2}}$ has six fingers, viz. $F^3$ to $F^8$, and so on.

Only six sliding bars are shown in Fig. 2.

$R^1$ is a roller with suitable contact studs $Q^a$ $Q^b$ etc. see Fig. 4 thereon, e. g. with 28 such contact studs, with each of which studs the corresponding finger F is adapted to make contact (as the roller $R^1$ rotates) when the bar ($F^1$) carrying that finger is moved toward the roller $R^1$.

Each bar $F^1$ is provided with an electromagnet M so arranged that when energized the electro-magnet causes its corresponding bar $F^1$ to move toward the roller $R^1$.

Each electro-magnet M is provided with a spring tongue $m$ (Fig. 2) so arranged that when any electromagnet M is energized its corresponding spring tongue is attracted by and makes contact with the core of the electro-magnet; this completes a circuit through the battery and allows a current to flow through the said core and through the winding of the electro-magnet so that the latter continues to be energized even after its corresponding oscillator has ceased to function. This last mentioned circuit energizing the electro-magnet is maintained until the printing device P operates, but on that event the said circuit is broken and the spring tongue $m$ returns to normal position.

P is a printing device whereby on the operation of its electro-magnet the particular letter which happens at that time to be in position is printed on a suitable piece of paper.

The printing device is so connected to the roller $R^1$ that as each contact stud Q (Fig. 4) on said roller comes into the position for making contact with its corresponding finger F (as the roller rotates) so the corresponding letter on the wheel disk or roller of the printing device is brought into printing position and if at that moment its electromagnet is energized the particular letter then in position as aforesaid will be printed on the paper.

The operation is as follows:—

When a train of impulses is received by the aerial $A^2$, the detector D causes the circuit of the relay R to be closed once for each impulse and thereby introduces in the relay circuit a train of impulses of a frequency equal to that of the train of impulses received by the aerial $A^2$; this last mentioned circuit contains the electromagnets of the oscillators O and the particular oscillator which is timed to the frequency in question will be operated and cause the closing of a circuit as explained in the aforesaid specification No. 22807 of 1914 and No. 134297.

The oscillators are so arranged that each is tuned to the frequency of the corresponding rotary impulsator of the despatching apparatus.

Figure 10:
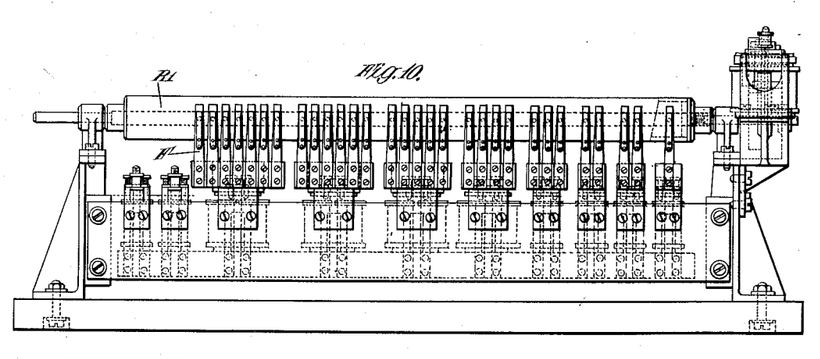
Figure 11:
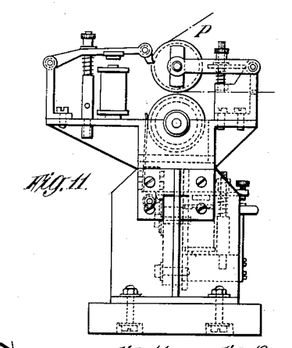
Figure 12:
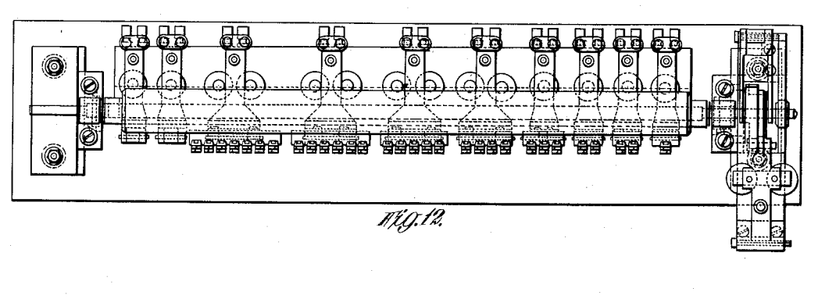
Figure 13:
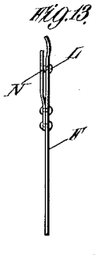
Figs. 13 and 14 illustrate the form of contract finger used in Fig. 10.
Figure 14:
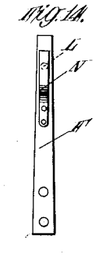

Suppose now that the key $K^1$ (Fig. 1) has been operated so as to make contact with the bar $B^1$ then, as described above, impulses of radiant energy of a frequency corresponding to that of a rotary impulsator $R^1$ are radiated from the aerial $A^1$ and are received by the aerial $A^2$ (Fig. 2) and these as above explained cause electric impulses of the same frequency to pass through the magnets of the oscillators O and this particular frequency of impulses will operate the oscillator $O^1$ and cause the closing of its circuit through the commutator $C^1$ and the electromagnet $M^1$ Figs. 2, 4, and 10. The energizing of the electro-magnet $M^1$ (Figs. 2, 4, and 10) causes the bar $F^1$ to be moved toward the roller $R^1$ so that the fingers $F^2$ to $F^8$ make contact in turn each with its corresponding contact stud on the roller $R^1$ as the latter rotates. The current through the magnet $M^1$ continues and the forward position of the bar $F^1$ is maintained (even after the oscillator $O^1$ ceases to be operated on by the impulses of appropriate frequency) until the printing device P operates.

When the key $K^1$ (Fig. 1) breaks contact with the bar $B^1$ and makes contact with the second contact $C^2$ another train of impulses is emitted from the aerial $A^1$ and received by aerial $A^2$ (Fig. 2) and these impulses have a frequency corresponding to rotary impulsator $R^2$.

In the manner above described these impulses cause the operation of oscillator $O^2$ (Fig. 2) and thereupon the circuit through commutator $C^2$ finger $F^2$ roller $R^1$ the electro-magnet of the printing device P and oscillator $O^2$ is closed; but it is to be noted that such circuit is only actually closed when the contact stud or roller $R^1$ is brought on rotation of that roller opposite the end of the finger $F^2$; at this moment the corresponding letter in the printing device P is in printing position and as the electro-magnet of the printing device is then energized that particular letter will be printed on the paper; this last operation breaks the circuit of the magnet $M^1$ and the bars $F^1$ return to normal.

Normally the commutators C (Figs. 1 and 2) are connected with the corresponding rotary impulsators and oscillators respectively $i.\ e.$ $C^1$ is connected with $R^1$ (or $O^1$) and so on.

The commutators are so devised that these connections can be varied, so that instead of commutator $C^1$ being connected with rotary impulsator $R^1$ (Fig. 1) it may be connected with $R^2$ and then $C^2$ will be connected with $R^3$ and so on; and similarly in the case of the commutator $C^1$ in Fig. 2.

Figure 3:
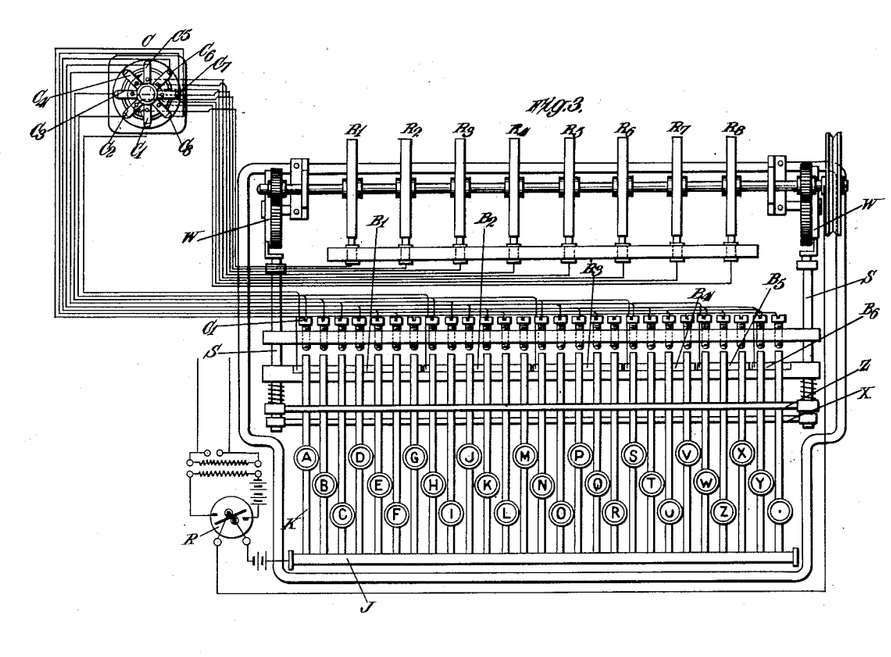

The device by which this may be effected is illustrated at C in Figs. 3 and 4. It will be seen that the commutator C comprises a number of arms $C^1$ $C^2$ $C^3$, etc., mounted on an axis and capable of being rotated as indicated by the arrow; beneath each arm $C^1$ $C^2$ $C^3$, etc., is a stationary contact—the arm $C^1$ being in contact with rotary impulsator $R^1$, $C^2$ with $R^2$, and so on.

Now if the said device be rotated one point in the direction indicated by the arrow it will be seen that contact between $C^1$ and $R^1$ will be broken and contact made between $C^1$ and $R^2$; in this position $C^2$ will be in contact with $R^3$, and so on. If while in this position the key $K^1$ is operated (Fig. 1) in the manner above described, then it will be seen that two trains of waves of frequencies corresponding to the rotary impulsators $R^2$ $R^3$ (instead of $R^1$ and $R^2$) will be emitted in succession from the aerial $A^1$ and if a similar rearrangement of the commutator connections has previously been made in the receiving apparatus, then the said succession of trains of waves will cause the printing of the same letter as before, and in this way the frequencies of the trains of impulses can be constantly changed and thereby still further secrecy can be secured.

Referring now to Fig. 3, it will be seen that the keys K are in the form of elongated bars (each bearing an index disk indicating the letter to which it corresponds) attached at one end to roller J.

Figure 5:
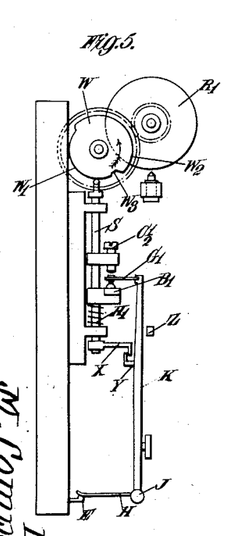
Fig. 5 is a side view of Fig. 3.
Figure 8:
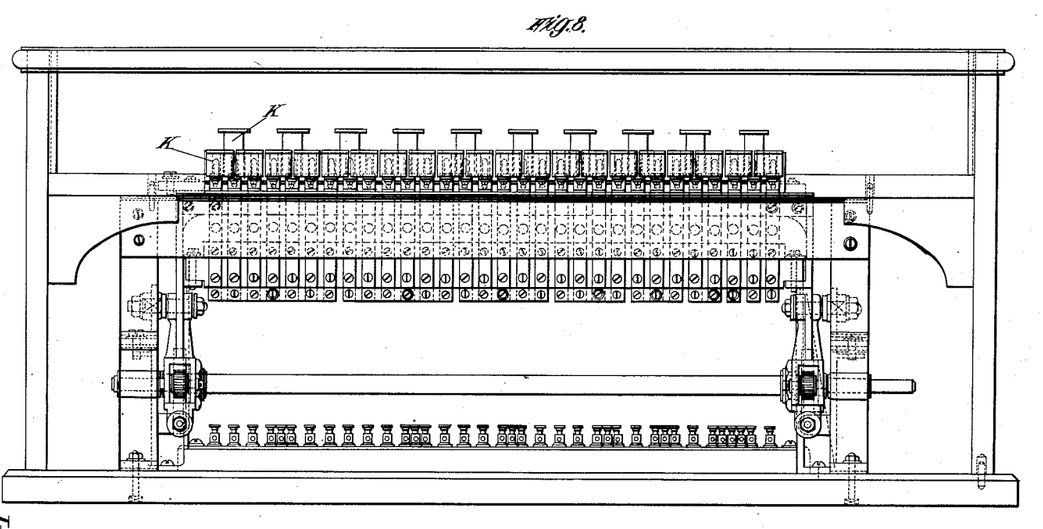
Fig. 8 is a front elevation of one from of despatching apparatus.
Figures 9, 11:
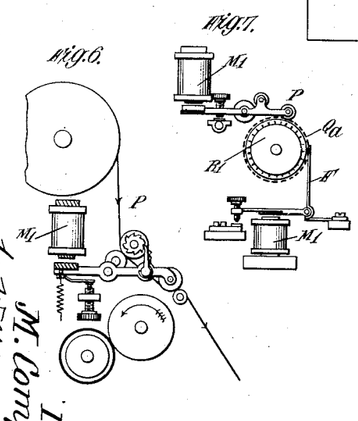
Fig. 9 is a side view of Fig. 8 but on a larger scale.
Figs. 10, 11 and 12 are front elevation, side elevation, and plan view respectively of one form of receiving apparatus.
Figure 9:
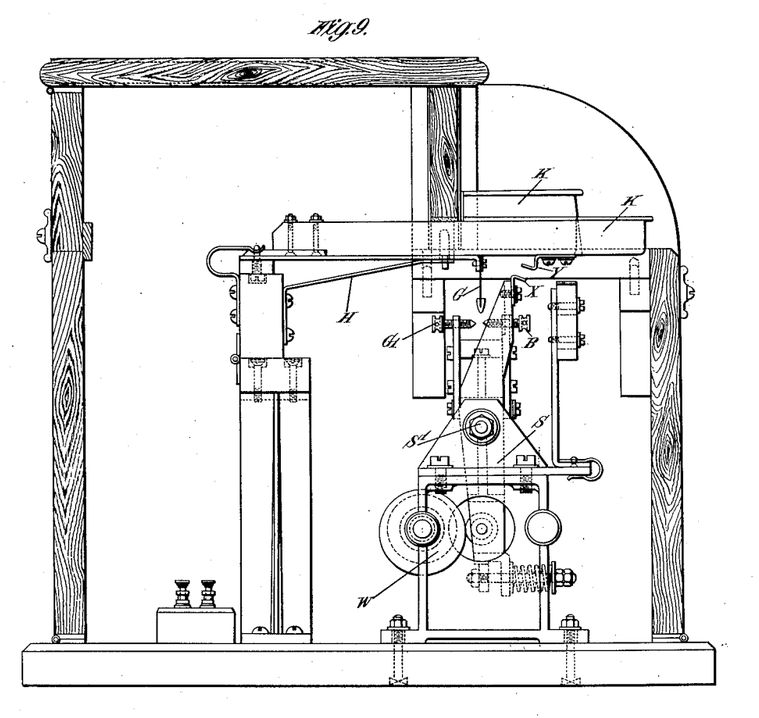

The arrangement and operation are shown more clearly in side view Fig. 5; H is a spring bearing against stop E normally tending to cause the finger K to lie against the elongated stop bar Z; $G_1$ is spring contact attached to the end of key K remote from J and having a contact surface, which when the said key K is depressed lies between the contact $C^2$ and one of the contacts on bar $B^1$. The contacts $C^1$ are attached by an elongated bar to two spring actuated spindles S (one at each side of the apparatus see Fig. 3) and bars B are also attached to the same spindles.

The spindles S carry at one end an elongated bracket X which is arranged to engage with bracket Y (one carried on the underside of each key K); W W are two cam wheels against the surfaces (peripheries) of which the ends of the spindles S are kept in contact by the action of the springs $H^1$ on said spindles. Each wheel W has two cam surfaces $W^1$ and $W^2$ (each occupying approximately one half of the periphery of the wheel) and a depression $W^3$. The wheels W are constantly rotated.

Normally the horizontal arms of the brackets Y lie above and against the corresponding arm of the bracket X, so that on pressure being applied to any key it will not be capable of being depressed until the ends of the spindles S occupy the depression $W^3$, the key can then be depressed and thereupon the contact surface on the spring contact G is brought into position between the contacts $C^1$ and B and in contact with B. On the further rotation of the wheels W the spindles S are moved by their ends coming in contact with cam surfaces $W^1$ which causes the arm of the bracket X to engage above the arm of the bracket Y and this prevents the return of the key to its normal position until on completion of the rotation of the wheels W the ends of the spindles S again occupy the depressions $W^3$.

So long as the ends of the spindles S engage with the cam surface $W^1$ the contact between B and G is maintained but on further rotation of the wheels W the cam surfaces $W^2$ cause a further movement of the spindle S and thereupon the connection between B and G is broken and that between $G^1$ and $C^1$ is made; this last mentioned connection is maintained until the depressions $W^3$ come opposite the ends of the spindles S whereupon the key K is returned to its normal position under action of spring H.

Figs. 8, 9, 10, 11, 12, 13 and 14 illustrate a modified form of apparatus in which the keys K are similar to the keys of a piano; the member S (Fig. 9) instead of being in the form of a spindle is a double armed lever fulcrumed at $S^1$ and spring actuated so as to keep its lower end in contact with the eccentric wheel W.

In the receiving apparatus (Fig. 10) instead of the rotating roller $R^1$ having contact studs thereon, the said roller is covered with a perforated membrane or covering, e. g. a piece of paper perforated in a manner similar to the record of a mechanical piano player and the fingers F are adapted (when moved into position as above explained) to make contact with the roller $R^1$ as the perforations come opposite the contact points of the said fingers. The form of the fingers is shown in detail in Figs. 13 and 14; the contact point is formed by the ball L which partially projects through a circular hole in the finger F and is kept in position by the tongue or spring N. The ball L, having a certain freedom of rotation, constantly presents a fresh portion of its surface to act as contact point, for example I may employ a similar apparatus to that described in the specification of a concurrent application for British Patent No. 1315 of 1919 at either the receiving end or the despatching end or both.

What I claim is:—

1. A signaling system comprising means for producing high frequency oscillations, means for successively impressing thereon a plurality of different group frequencies, a receiving device, and means for causing the operation of said device only by the conjoint action of the successively transmitted group frequencies impressed on said high frequency oscillations.

2. In a high frequency signaling system means for producing high frequency oscillations, means for successively impressing thereon a plurality of different group frequencies, a receiving device, and means for causing the operation of said device by the conjoint action of the successively transmitted group frequencies impressed on said high frequency oscillations.

3. A high frequency signaling system comprising means for producing high frequency oscillations, a signal means for successively impressing thereon a plurality of different group frequencies, a signal receiving device, and means for causing the operation of said device only by the conjoint action of the successively transmitted group frequencies impressed on said high frequency oscillations.

4. A high frequency signaling system comprising means for producing high frequency oscillations, a signal means for successively impressing thereon a plurality of different group frequencies, and a receiving device embodying means for causing the operation of said device by the conjoint action of the successively transmitted group frequencies impressed on said high frequency oscillations.

5. A high frequency signaling system comprising means for producing high frequency oscillations, means for successively impressing thereon a plurality of different group frequencies, a signal receiving device, and means for causing the operation of said device only by the conjoint action of the successively transmitted group frequencies impressed on said high frequency oscillations.

6. A signaling system comprising means for producing high frequency oscillations, a plurality of individual means for successively impressing thereon a plurality of different group frequencies corresponding to various signals, and a receiving device embodying means for causing the operation of said device only by the conjoint action of the successively transmitted group frequencies impressed on said high frequency oscillations in various combinations initiated by said first means for effecting successively desired signals.

7. A signaling system comprising means for producing high frequency oscillations, a pair of contacts, a key for said pair of contacts adapted on operation to make connection with each contact in succession, means including the contacts for successively impressing on said high frequency oscillations a plurality of different group frequencies upon operation of said key, a receiving device, and means for causing the operation of said device only by the conjoint action of the successively transmitted group frequencies impressed on said high frequency oscillations.

8. A signaling system comprising means for producing high frequency oscillations, a pair of spaced apart contacts, a key arranged for operation between the contacts and adapted when actuated to engage one contact, means for shifting said keys to release said contact from the key and engage the other contact therewith, means including said contacts for producing groups of different frequencies adapted to be impressed upon said high frequency oscillations, a receiving device, and means for causing the operation of said device only by the conjoint action of the successively transmitted different group frequencies impressed on said high frequency oscillations.

MANRICO COMPARE.